(12) United States Patent
Mills et al.

(10) Patent No.: US 10,137,966 B1
(45) Date of Patent: Nov. 27, 2018

(54) SYSTEM AND METHOD FOR PROVIDING RECIRCULATION-BASED ALTERNATING BLOWDOWN SEA CHEST

(71) Applicants: Eric Mills, Annapolis, MD (US); Ryan Mills, Annapolis, MD (US)

(72) Inventors: Eric Mills, Annapolis, MD (US); Ryan Mills, Annapolis, MD (US)

(*) Notice: Subject to any disclaimer, the term of this patent is extended or adjusted under 35 U.S.C. 154(b) by 0 days.

(21) Appl. No.: 15/892,539

(22) Filed: Feb. 9, 2018

(51) Int. Cl.
  *B63B 13/00* (2006.01)
  *B63B 39/03* (2006.01)
  *G05D 7/06* (2006.01)

(52) U.S. Cl.
  CPC .............. *B63B 13/00* (2013.01); *B63B 39/03* (2013.01); *G05D 7/0652* (2013.01); *B63B 2013/005* (2013.01)

(58) Field of Classification Search
  CPC ......... B63B 13/00; B63B 13/02; B63B 39/00; B63B 39/03; B63B 57/00
  USPC .................................................. 114/125, 121
  See application file for complete search history.

(56) References Cited

U.S. PATENT DOCUMENTS

| 4,314,519 A * | 2/1982 | Yunoki | B63B 39/03 114/125 |
| 5,692,451 A * | 12/1997 | Pastore | B63B 13/02 114/125 |
| 6,053,121 A * | 4/2000 | Tamashima | B63B 13/00 114/125 |
| 6,766,754 B1 * | 7/2004 | Scott | B63B 13/00 114/125 |
| 6,904,858 B2 * | 6/2005 | Pastore | B63B 13/02 114/125 |
| 8,215,254 B2 * | 7/2012 | Pavlow | B63B 13/02 114/125 |

* cited by examiner

*Primary Examiner* — Lars A Olson
(74) *Attorney, Agent, or Firm* — The Rapacke Law Group P.A.

(57) ABSTRACT

Embodiments described herein provide recirculation-based alternating blowdown sea chest. The sea chest has a cover assembly with a plurality of grates thereon. Each grate is connected with a pipe in fluid communication with a pump. The pump provides suction while a plurality of valves modulate the flow of water through the system. A recirculation pipe promotes the blowdown of fluids within the system and permits tandem function of water intake and expulsion resulting in maximum efficiency of the sea chest with continuous functionality while in use.

20 Claims, 7 Drawing Sheets

SYSTEM AND METHOD FOR PROVIDING RECIRCULATION-BASED ALTERNATING BLOWDOWN SEA CHEST

FIELD

The present invention generally relates to a system and method for a recirculation-based alternating blowdown sea chest.

BACKGROUND

A sea chest is generally known as a rectangular or cylindrical recess in the hull of a ship. The sea chest provides an intake reservoir from which a ducted system draws raw water. The recess may be covered by a grate to aid in water filtration and is in fluid communication with the ducted system. These assemblies are used to collect water needed for engine cooling, however, other applications to the technology do exist.

Current sea chests generally have a single large opening through a bottom surface for drawing in water and one or more inlet openings through an opposing top surface in fluid communication with any number of water pumps. Their effectiveness depends on the size and volume of the water that can flow through the ducting to effectively provide an influx of water through the system. This may be impeded by debris present in the water such as vegetation, garbage, or marine organisms. To combat infestation, a grate is generally employed over the aperture of the sea chest to selectively permit the ingress and egress of substances.

U.S. Pat. No. 2,350,598 to Frederick A. Faville relates to marine type power plants, and includes among its objects and advantages an increase in adaptability to different conditions of service; and throughout the range of service condition, an increased protection of the cooling system from strains and stresses, particularly those due to thermal expansion and contraction. Though the patent to Faville does disclose higher seawater velocities which may increase turbulence and minimize fouling in the cooling tubes, it fails to disclose both a design having a varying volume of recirculated water which allows for a constant inlet temperature or multiple sea chests with backwashing capabilities.

U.S. Pat. No. 6,699,087 to Samuel Barran Tafoya discloses a sea chest that can provide a large volume of water substantially without drag or cavitation for cooling the inboard engines of a marine vessel. The keyhole shape through the bottom surface of the sea chest is critical to its function and causes eddies to form at its outside edges, as well as water to flow into the sea chest at the center of these edges. The present invention sea chest also has an orifice through which a quick burst of air or water can be sent to clean debris clogs and eliminate the need for manual cleaning. The present invention size and mounting location are determined by its application. Although not limited to it, use of the present invention is contemplated for large and high-speed marine vessels. However, the present invention can also provide benefit to small marine vessels, including those as small in length as twenty feet. The Tafoya patent discloses a sea chest with an orifice through which a burst of air or water may be sent to clean debris, it fails to disclose a design incorporating parallel inlet ducts.

U.S. Patent Pub. No. 2014/0291261 to David Kan Yee and assigned to Eaton Corporation discloses a fluid filtering system with backwashing, particularly for ballast tanks, employing a pump with its inlet connected to receive fluid which is filtered and the outlet of the pump to a unified filtering vessel with apparatus for sequentially backwashing individual filter media elements and connecting the backwash to a drain. The unified filtering vessel has a filtrate outlet connected through a valve for filtering flow to and from ballast tanks. The filtrate outlet is also connected through another valve to the inlet of the pump for including clean filtrate in the backwashing. The Eaton Patent fails to disclose parallel inlet ducts and is utilized for ballast tanks.

U.S. Pat. No. 5,692,451 to Joseph Pastore discloses a sea chest cover for providing access to the sea chest of a ship. The sea chest cover is fabricated essentially entirely of one or more viscoelastic materials, preferably either polyethylene or polyurethane. Fabrication of the sea chest cover from a viscoelastic material reduces or eliminates corrosion and erosion problems. It also minimizes marine organism and ice build-up. The result is a reduction in the expense associated with maintaining such covers. The fabrication of the sea chest cover also minimizes the weight of such components, thereby making handling and maintenance easier. The sea chest cover is either pre-formed to a shape conforming with the shape of the ship's hull in the area where the sea chest is located, or it is sufficiently flexible to be placed into such conformance. The sea chest cover of the present invention may be formed as a unitary piece or as a plurality of removably connectable parts.

U.S. Patent Pub. No. 2014/0042062 to Matthew DaCosta et al. and assign to Trojan Technologies discloses a fluid treatment system that is particularly well suited for treating ballast water on a shipping vessel. The present fluid treatment system is characterized by having two general modes of operation. A so-called ballasting mode and a so-called deballasting mode.

U.S. Patent Pub. No. 2011/0108483 to Povl Kaas discloses a filter unit for purification of impure water, which could be seawater intended for ballast water, pool water, wastewater, or the like. The purification is performed by means of filter modules comprising filter means with dead end filter elements of a sintered material, and the filter unit facilitates alternating backwashing of the filter means at the same time as the filter unit may perform filtration of the impure water. The invention likewise relates to use of a dead-end filter element in a de-gassing version, the filter element comprising a top end, a bottom end and a plurality of substantially parallel arranged channels with blockings in different ends.

It can be seen that advances in the arts surrounding sea chest technologies is warranted. One such advance is described herein.

SUMMARY OF THE INVENTION

Embodiments described herein provide for a recirculation-based alternating blowdown sea chest. It is an objective of the present invention to maximize the operational ability of ships, power plants, or any raw water-using complex that uses raw water for cooling or any other means by mitigating the probability of a clog and thus reducing maintenance expenses. It is another objective of the present invention to maintain the operational ability of the sea chest system such that the system provides an influx of fluid and permits a blowdown procedure in tandem.

The recirculation-based alternating blowdown sea chest system comprises a cover assembly having a plurality of grates disposed thereon. Each grate has a pipe connected thereto and is configured to selectively permit the ingress and egress of fluids. Valves, wherein each are disposed the pipes and are configured to operate in a first mode and a second mode. The first mode includes a first isolation valve which is open, a second isolation valve that is shut, a first blowdown isolation valve that is shut, and a second blowdown isolation valve that is open. The second mode includes a first isolation valve that is shut, a second isolation valve that is open, a first blowdown isolation valve that is open, and a second blowdown isolation valve that is shut. A discharge pipe facilitating the egress of fluids and a pump is disposed between the cover assembly and the discharge pipe. The pump is configured to promote suction of fluid through the cover assembly. A recirculation pipe is configured to draw water from the discharge pipe and facilitate the blowdown of the system by performing first mode and the second mode procedures to facilitate constant variable ingress and egress of fluids.

In an embodiment, the cover assembly defines a water transference area. The cover assembly is constructed having a hydrodynamic profile to facilitate the ingress and egress of fluid therethrough.

In one embodiment, any number of the first and second suction isolation valves and any number of the first and second blowdown isolation valves are solenoid valves. In an alternate embodiment, any number of the first and second suction isolation valves and any number of the first and second blowdown isolation valves are pneumatic valves.

The user may select a specific time interval for each of the modes of the system. Data may be stored using a data storage device. A user interface is in communication with a processor which is configured to instruct the system to switch from the first mode and the second mode at the user-specified time interval. In an embodiment, a time delay it utilized to ensure the pump does not lose suction.

The sea chest is disposed within the hull of a vessel such that the engine may be effectively cooled or any other raw water-using component has adequate flow and pressure. To accomplish this, each grate must be positioned below the waterline of the hull.

A method for an alternating recirculation-based blowdown of a sea chest is disclosed and comprises the steps of a user selecting a first mode of operation as well as a time interval corresponding to the first mode. The pump then initiates suction to the sea chest system, thus drawing water in through the grates. Fluid is then discharged from a discharge port while a recirculation pipe draws fluid for recirculation through the system. The process is then switched to alternate between suction and blowdown procedures.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
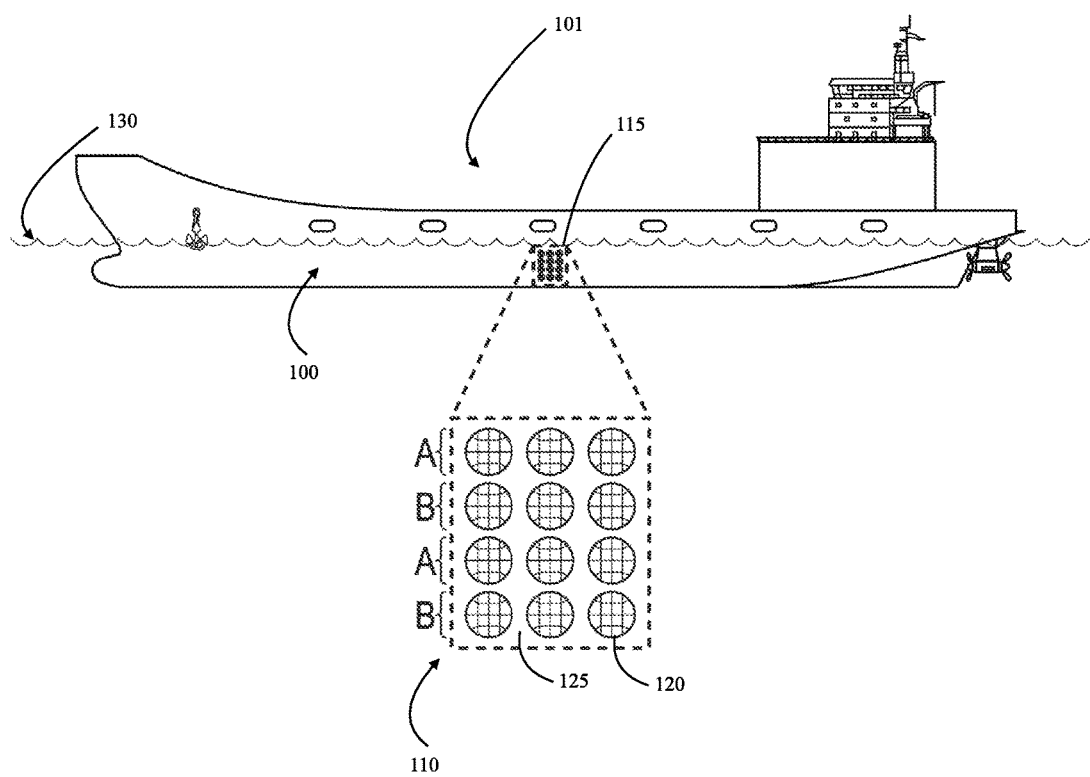
FIG. 1 illustrates a schematic of a ship having an intake cover assembly, according to an embodiment of the present invention.

The specific details of the single embodiment or variety of embodiments described herein are set forth in this application. Any specific details of the embodiments are used for demonstration purposes only and no unnecessary limitation or inferences are to be understood therefrom.

Any reference to "invention" within this document is a reference to an embodiment of a family of inventions, with no single embodiment including features that are necessarily included in all embodiments, unless otherwise stated. Furthermore, although there may be references to "advantage's" provided by some embodiments, other embodiments may not include those same advantages, or may include different advantages. Any advantages described herein are not to be construed as limiting to any of the claims.

Before describing in detail exemplary embodiments, it is noted that the embodiments reside primarily in combinations of components related to the sea chest system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In general, the invention described herein relates to a sea chest assembly providing water flow, whether salt, brackish, or fresh, to cool or pressurize components of a marine vessel or raw water-using complex such as a power plant. Commonly, sea chests are utilized to cool engine components, however, they may be adapted to draw water into a plurality of systems. These may include generator cooling, wherein the sea chest is configured to cool a generator. Further, the sea chest may be used in systems necessitating a flow of fluid such as a water main or fire sprinkler system.

Sea chests may be positioned in most any location on the ship's 101 hull 100. The sea chest is accessed from the exterior of the hull using one or more covers or cover assemblies 110 which are typically designed to conform substantially to the hull 100 shape. Each cover assembly defines a water transference area 115 of the hull. The cover assembly 110 and water transference area 115 is comprised of a plurality of grates 120 that permit water to ingress and egress the sea chest dependent on the pressure differential between the sea chest interior and exterior of the hull 100. In the event that the pressure is stabilized, any water within the sea chest is essentially stagnant, regardless of water flow rate across the hull exterior.

When equipment within a sea chest must be repaired or otherwise worked on, the sea chest cover assembly 110 is typically removed. In lieu of this circumstance, it may be preferential to construct the sea chest cover assembly 110 of substantially lightweight material to facilitate servicing of the system 10. One skilled in the arts may appreciate that the cover assembly 110 may be constructed of any number of grate 120 components including a single fused assembly. The single assembly embodiment may be most practical on a smaller vessel when a substantially smaller sea chest and water transference area 115 is utilized. As a result of the vast size and shapes of ship hulls, one skilled in the art may appreciate that a wide variety of cover sizes and shapes may be utilized along with the present invention.

In an embodiment, each grate 120 of the sea chest cover assembly 110 may pivotally engaged with the cover member 125 to selectively permit the ingress and egress of fluids through the grates 120.

As illustrated in FIG. 1, the sea chest cover assembly 110 forms part of a hull 100 of a ship 101 defining a water transference area 115. Conformance to the hull 100 shape may be achieved by pre-forming the cover assembly 110 to the shape of the hull. In further embodiments, the sea chest cover assembly may be constructed of substantially flexible material to conform to the shape of the hull 100 at the time of application. A single ship 101 may be comprised of a plurality of sea chests systems 10 and therefore have any number of cover assemblies in communication with a system 10 disposed on the hull 100 thereof. These may be located fore and aft, and port and starboard below the waterline 130 of the ship 101. It is to be understood that this discussion of the preferred embodiment of the present invention may be applied to the wide variety of sea chest covers required, independent of shapes and dimensions.

Figure 2:
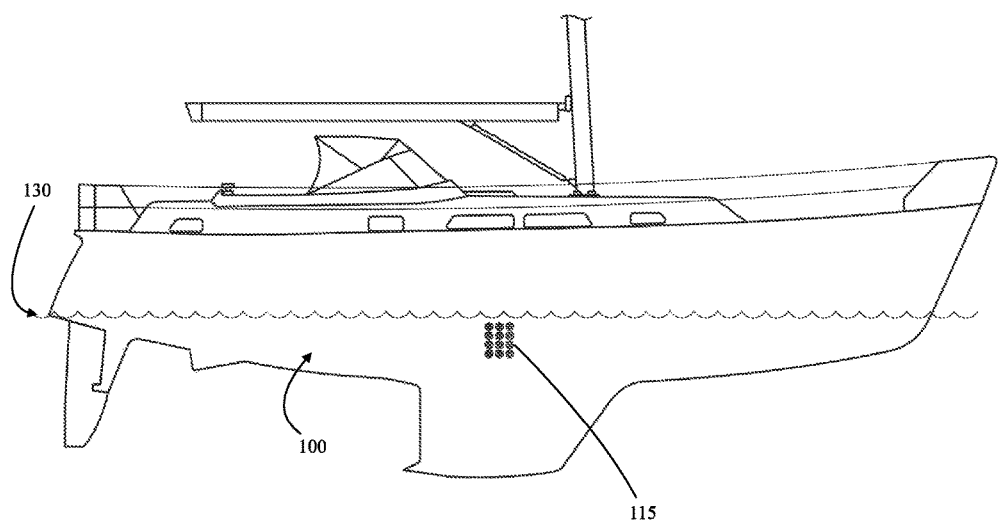
FIG. 2 illustrates a schematic of a personal watercraft having an intake cover assembly, according to an embodiment of the present invention.

FIG. 2 illustrates a sea chest cover assembly 110 disposed on a sailboat or similar recreational vessel. It can be found that the vessel in FIG. 2 may comprise a much smaller water transference area 115 than a commercial vessel as illustrated in FIG. 1.

Figure 3:
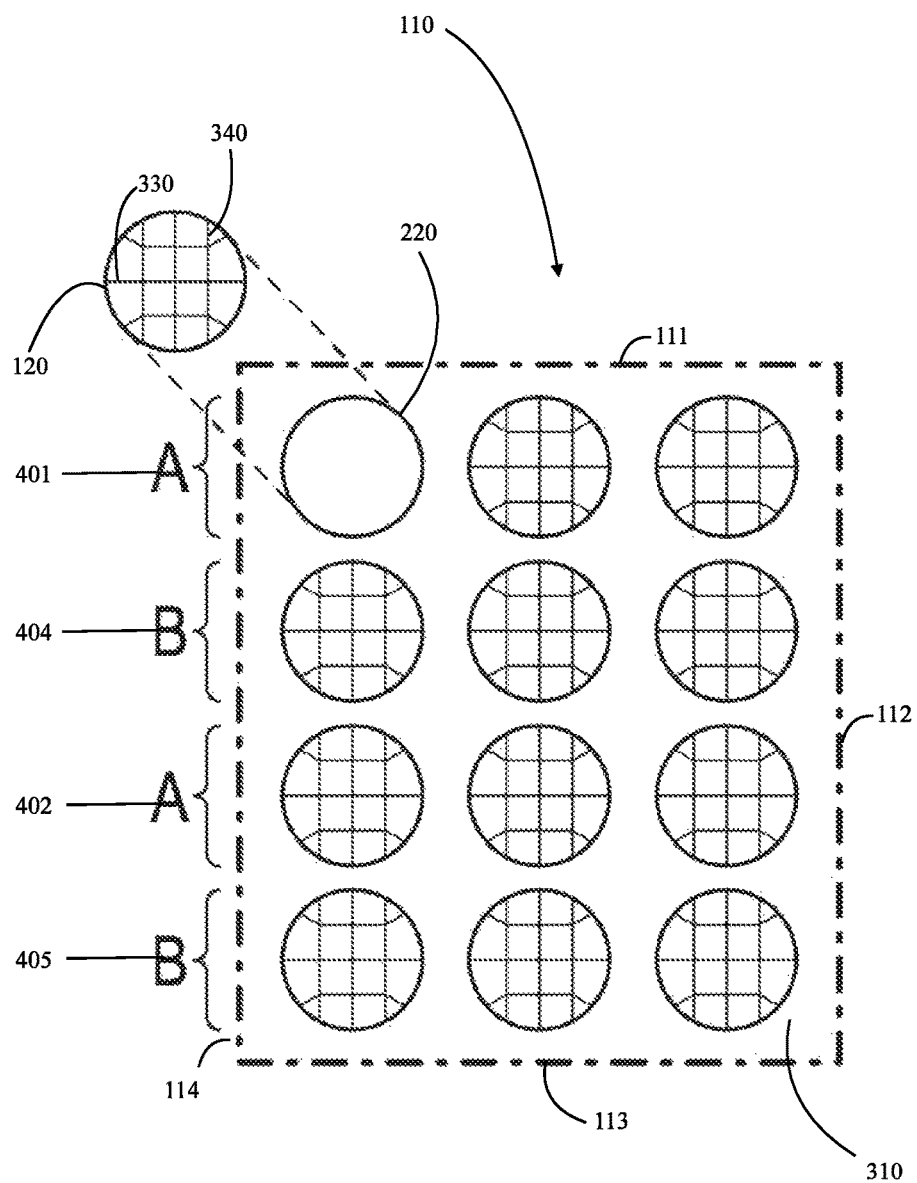
FIG. 3 illustrates a front elevation view of the intake cover assembly, according to an embodiment of the present invention.

Now referring to FIG. 3, each sea chest cover assembly is comprised of a housing 310 having a plurality of apertures 220 disposed therethrough. A grate 120 covers each aperture 220 selectively permitting fluids to enter and exit the sea chest. Each grate 120 is configured to exclude large particles such as vegetation, organisms, and other contaminants from entering the sea chest system 10. Each grate 120 may be comprised of a plurality of transverse members 330 and a plurality of longitudinal members 340. Depending on the size of the sea chest system 10, size of the water transference area 115 or other parameter, the transverse and longitudinal members 330, 340 may have varying interspatial relations across the numerous embodiments. One skilled in the art may appreciate that a vast number of attachment means between the grates 120 and housing 310 may be employed including integral molding means and releasable engagement such as a screws or bolts and receivers. It may be preferencial to provide releasable engagement of the grates 120 to permit their removal, servicing, and replacement of necessary. In this manner, the housing 310 and grates 120 may be fabricated and separate pieces and therefore may be molded, bonded, screwed or otherwise connected together.

In a preferred embodiment, the edges 111, 112, 113, 114 of the cover assembly 110 are constructed and molded to form a smooth hydrodynamic profile minimizing water flow turbulence and therefore enhancing the water flow rates and minimizing vibrational energy.

Each of the plurality of apertures 220 are positioned at the ends of hermetically sealed piping configured to direct the flow of fluids therethrough. In the preferred embodiment, each grate 120 in fluid communication with a single pipe.

Figure 4:
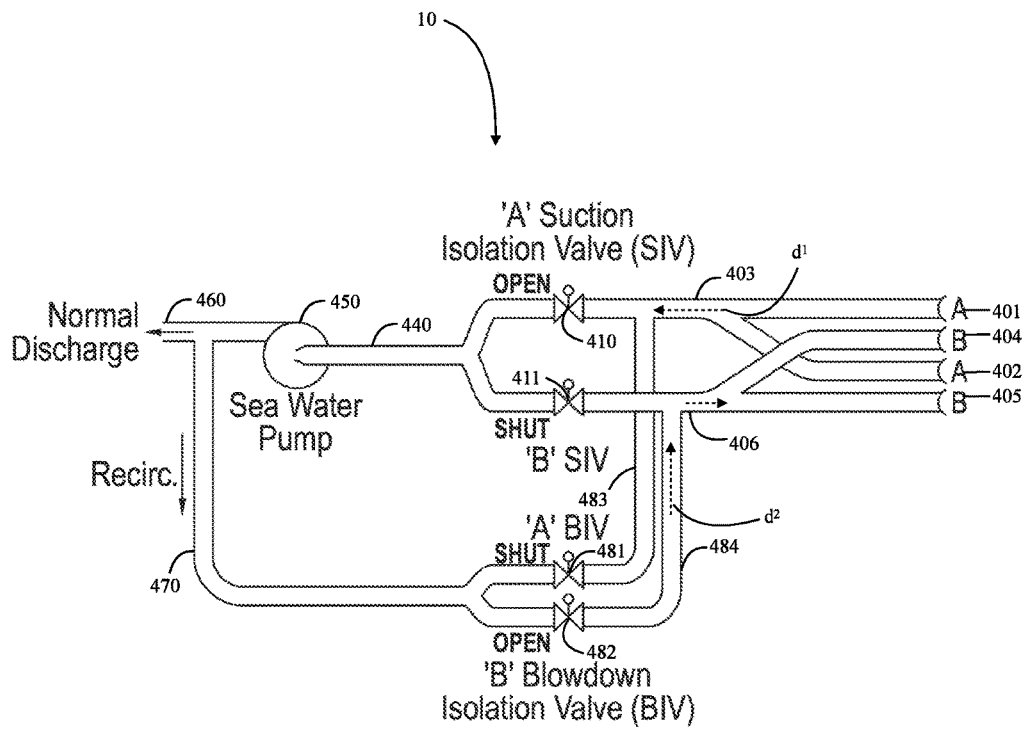
FIG. 4 illustrates a schematic of the sea chest system in a first mode of operation, according to an embodiment of the present invention.

Now referring to FIG. 4 the sea chest system 10 is illustrated as a schematic according to an embodiment of the present invention. For convenience, the system has been given two groups; Group A and Group B. Group A denotes pipes labeled "A" in FIG. 4 and FIG. 5 while while Group B denotes pipes labelled "B" in FIGS. 4 and 5. While a limited number of pipes are shown, the invention may be scaled to accommodate any number of intake grates having individual pipes connected thereto. Referring back to FIG. 4, each of the two A pipes each have a grate 120 in communication with the cover assembly. Similarly, each of the two B pipes each have a grate 120 in communication with the cover assembly. The pipes and grates may be hermetically sealed, bonded, or otherwise sealingly engaged to prohibit leakage therefrom.

In a preferred embodiment, a first A pipe 401 and a second A pipe 402 are configured to form a first header section 403. Similarly a first B pipe 404 and a second B pipe 405 are configured to form a second header section 406. Each of the first and second headers sections 403, 406 are isolated from one another by an A Suction Isolation Valve 410 ("SIV") and a B SIV 411. Each valve may be selectively opened or closed to permit or prohibit the flow of water through the valve regions. A primary header section 440 is formed leading to a pump 450. As fluids are moved through the pump 450, a discharge pipe 460 extends therefrom permitting the egress of fluid once they have moved through the system and supplied necessary components.

In an embodiment, discharge pipe 460 is comprised of connection means at a distal region permitting the discharge pipe to be attached to an auxiliary system. For example, the discharge pipe may be used to simply pressurize a water main system that could include a sprinkler system. Connection means may include, but are not limited to threaded members and other configurations which facilitate a substantially hermetic seal.

A recirculation pipe 470 is in fluid communication with the normal discharge pipe 460. The recirculation pipe 470 redirects the flow of outgoing fluid back into the sea chest system. The recirculation pipe 470 forms a header of an A Blowdown Isolation Valve 481 ("BIV") and a B BIV 482. As fluids move through the recirculation pipe 470, fluids are directed toward either the A blowdown pipe 483 or the B blowdown pipe 484. Fluids are directed dependent on the open or closed configuration of the A BIV 481 and B BIV 482.

In an embodiment, recirculation pipe 470 has a recirculation pump positioned thereon and communication thereto. The recirculation pump aids in providing pressure to the recirculation pipe 470 and draws fluid therein.

Current art requires the sea chest system to be secured for the blowdown procedure to perform its function. Once the sea chest is secured, an alternate pressure source is utilized to clear the contents of the sea chest. This requires the system to be non functional for a period of time causing loss of resources and time. The current invention forgoes the need to secure the system and stop its function as fluids are being constantly recirculated into one of the two possible directional paths of flow. FIG. 4 illustrates an embodiment of the invention wherein the valve configuration results in the blowdown of the first and second B pipes 404, 405. In this configuration, the pump provides suction drawings water from the external environment of the hull 100 through the cover assembly 110 and into the sea chest system. Due to valve configuration described below, water is drawn in through such that the A SIV 410 is open permitting water to flow through along direction $d^1$. Meanwhile, the B SIV 411 is shut prohibiting the flow of water therethrough. Further, the A BIV 481 is shut while the B BIV 482 is open permitting water to flow along direction $d^2$. Table 1 illustrates the valve position in the present embodiment.

TABLE 1

| VALVE | VALVE POSITION (open/shut) |
|---|---|
| A SIV | OPEN |
| B SIV | SHUT |
| A BIV | SHUT |
| B RIV | OREN |

The valve configurations in Table 1, and the first mode of operation result in water ingressing through first and second A grates 401, 402 while water egresses through first and second B grates 404, 405. This results in the blowdown of blowdown B pipe 484 as well as second header section 406 and first and second B pipes 404, 405.

Figure 5:
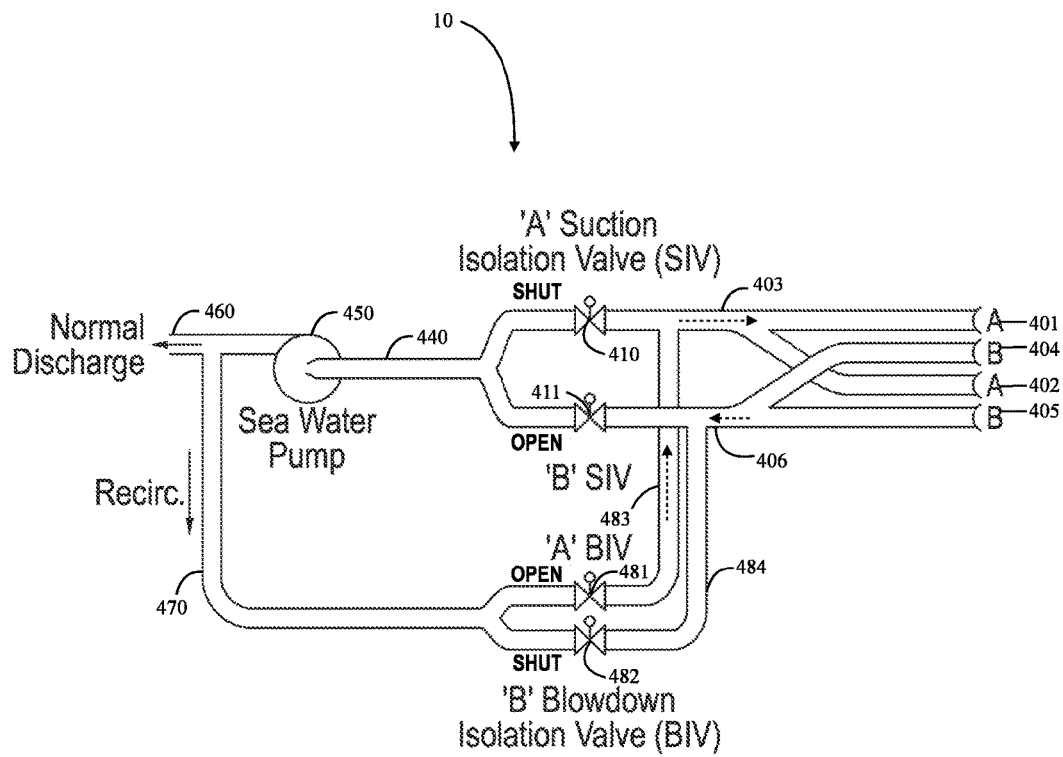
FIG. 5 illustrates a schematic of the sea chest system in a second mode of operation, according to an embodiment of the present invention.

The modulation of valve configurations allows the system to be continuously operable dependent on user input. In contrast to FIG. 4, FIG. 5 illustrates an opposing valve configuration details in Table 2 showing a second mode of operation. Upon user input, A SIV 410 may be shut while B SIV 411 is opened. Similarly. A BIV 481 is opened while B BIV 482 is shut. This results in an altered flow of the water, wherein water ingresses through first and second B pipes 404, 405 and water egresses through first and second A pipes 401, 402.

TABLE 2

| VALVE | VALVE POSITION (open/shut) |
|---|---|
| A SIV | SHUT |
| B SIV | OPEN |
| A BIV | OPEN |
| B BIV | SHUT |

Figure 6:
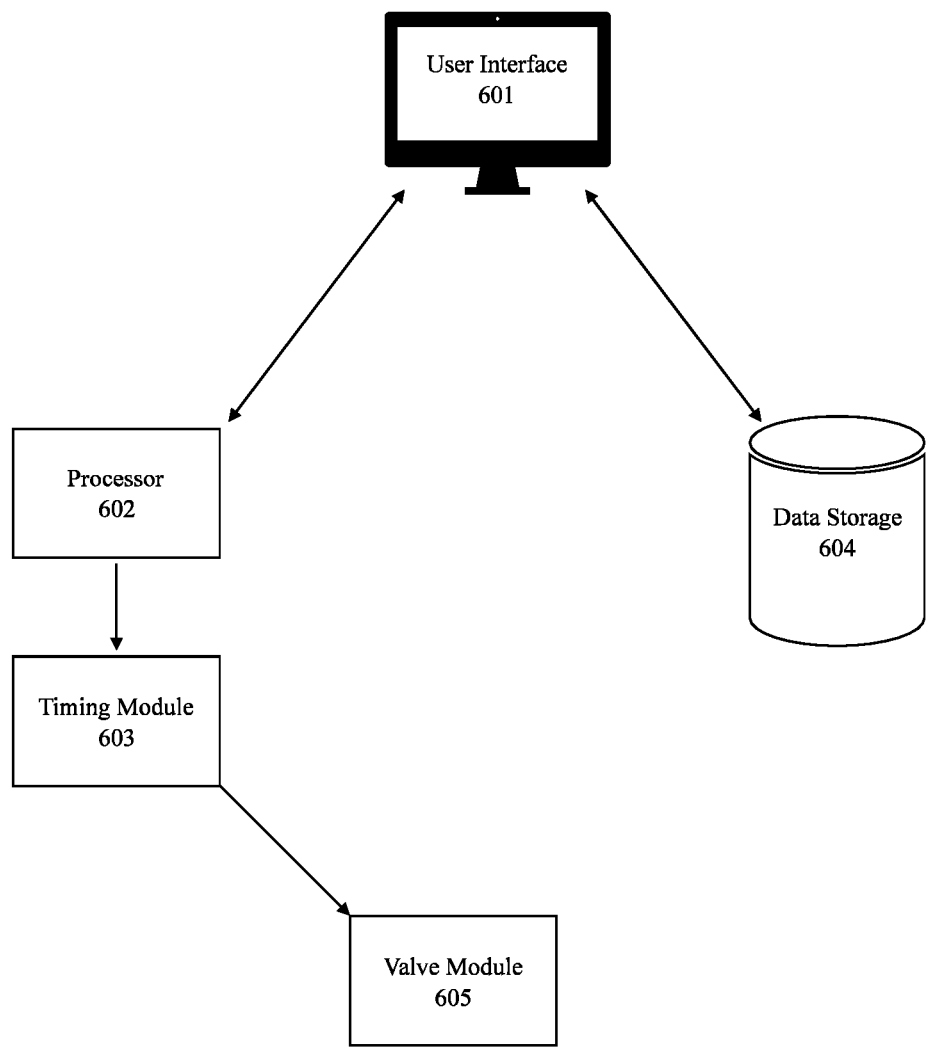
FIG. 6 illustrates a block diagram of the sea chest system, according to an embodiment of the present invention.

In a preferred embodiment and in reference to FIG. 6, each valve may be in electrical communication with a user interface 601 allowing the user to select the valve position of each valve in the sea chest. The user may elect to have valves switch between open and shut at predetermined time intervals to ensure the sea chest remains fully functional. A processor 602 sends instructions to the valve operating systems to open and shut predetermined valves at the time interval set utilizing a timing module 603. The time interval selected by the user may be stored in a data storage component 604 such as a hard drive. A valve module 605 performs the switching of valve position from open to shut. For example, the valve positions illustrated in Table 1 may switch to the valve positions illustrated in Table 2 every twenty-four hours. One skilled in the arts may note that a more complex sea chest system may require more frequent modulation between open and shut configurations of the valves.

In another embodiment, a plurality of operation modes may be implemented in addition to a simple timed protocol. This may include manual operation, automatic-time operation, and automatic pressure. The automatic pressure embodiment may rely on differential pressure senses by pressure detectors throughout the system wherein the differential pressure causes the alternation of valves between OPEN and SHUT positions.

In one embodiment, each valve, including the A and B SIV's 410, 411 and each A and B BIV's 481, 482 may be operated utilizing a solenoid valve. The solenoid valve may be electromechanically operated in either ON or OFF settings to open or close the valves. The solenoid valve may be the preferred choice of valve configuration as they are typically fast, safe, highly reliable, and offer a long lifespan. They also tend to be compact and require a low control power allowing convenient utilizing in marine vessels having spatial constraints.

In another embodiment, each valve, including the A and B SIV's 410, 411 and each A and B BIV's 481, 482 may be operated utilizing a pneumatic valve. Specific requirements may mandate or promote the usage of the pneumatic valve.

One skilled in the arts may appreciate that any suitable valve configuration may be utilized to selectively permit the ingress and egress of fluids through the system. Any combination of valves may be configured to revert to the SHUT position or OPEN position in the event of a valve failure.

In an embodiment, SIV valves 410 and 411 fail to an OPEN position while BIV valves 481 and 482 fail to a SHUT position to continue operation of the system upon loss of adequate valve control, pressure, or power.

Figure 7:
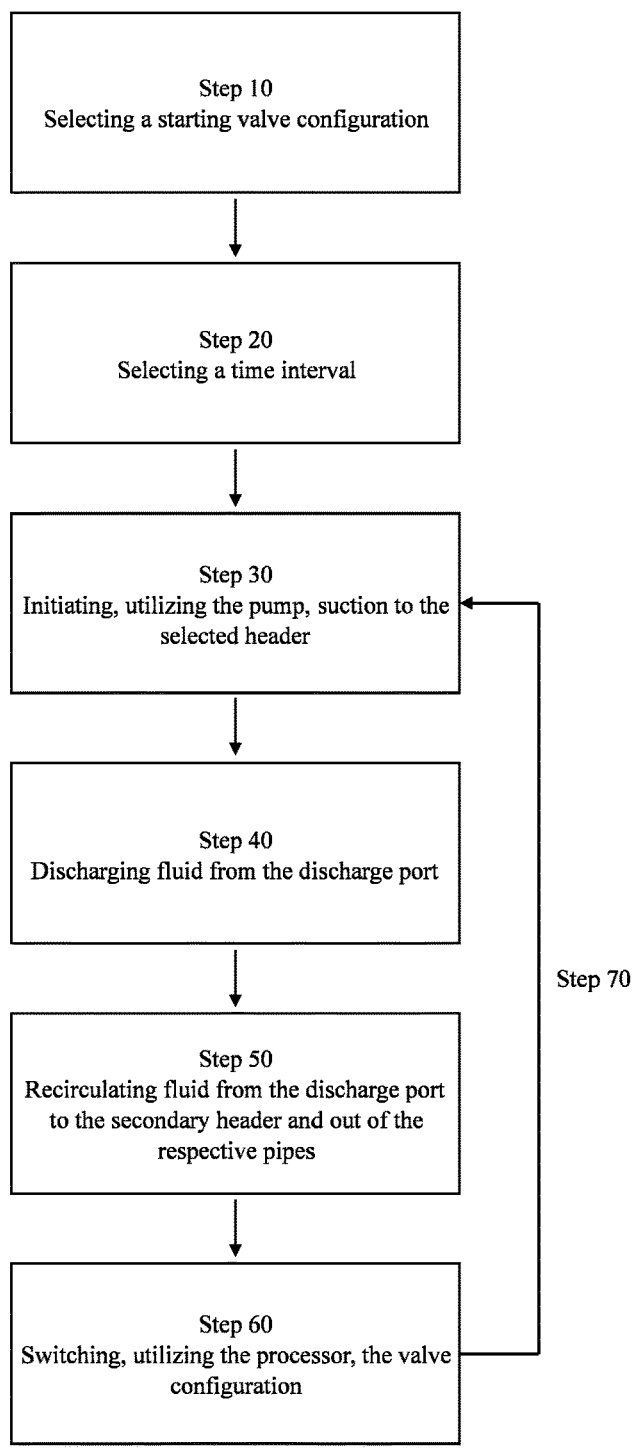
FIG. 7 illustrates a flowchart of a method for recirculating fluids in a sea chest, according to an embodiment of the present invention.

A method for the recirculation-based blowdown of a sea chest is illustrated in FIG. 7 and described herein. In step 10, a user selects a starting valve configuration indicating which header supplies suction therefore drawing fluid through its respective grates. In step 20, the user selects a time interval for the system to switch to a secondary configuration and thus switching the header supplying the suction. In step 30, the pump initiates suction of fluid through the user-indicated header drawing water in through the respective grates. In step 40, fluid is discharged through the discharge port. In step 50, fluid is recirculated from the discharge pipe and driven through the user-determined secondary header and out the respective pipes and grates of the blowdown header. In step 60, the processor instructs the valve positions to switch from open to shut and vice versa. In step 70, steps 30-60 are repeated for the blowdown valve positions allowing the sea chest system to continue providing influx of fluid while maintaining maximum efficiency.

In yet another embodiment, the user may elect to operate the system as a normal sea chest system and forgo the blowdown protocols described above.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A recirculation-based alternating blowdown sea chest system comprising:
 at least one cover assembly, each of the at least one cover assemblies having a plurality of grates disposed thereon, each grate having a pipe connected thereto, wherein each grate is configured to selectively permit the ingress and egress of fluids;
 a plurality of valves, wherein each valve is disposed along one of the pipes, wherein the valve system is configured to operate in a first mode in which a first isolation valve is open, a second isolation valve is shut, a first blowdown isolation valve is shut and a second blowdown isolation valve is open, and a second mode in which a first isolation valve is shut, a second isolation valve is open, a first blowdown isolation valve is open and a second blowdown isolation valve is shut;
 a discharge pipe facilitating the egress of fluids;
 a pump disposed between the at least one cover assembly and the discharge pipe configured to promote suction of fluid through the cover assembly; and
 a recirculation pipe configured to draw water from the discharge pipe, wherein the recirculation pipe facilitates the blowdown of the system, wherein the first mode and the second mode facilitate constant variable ingress and egress of fluids.

2. The system of claim 1, wherein the cover assembly defines a water transference area.

3. The system of claim 1, wherein any number of the first and second suction isolation valves and any number of the first and second blowdown isolation valves are solenoid valves.

4. The system of claim 1, wherein any number of the first and second suction isolation valves and any number of the first and second blowdown isolation valves are pneumatic valves.

5. The system of claim 1, wherein each grate is removably engaged with a housing.

6. The system of claim 1, wherein a user sets a time interval within a user interface between the first mode and the second mode.

7. The system of claim 1, having a user interface in communication with a processor, wherein the processor is configured to instruct the system to switch from the first mode and the second mode at a time interval, wherein the time interval is determined by a user utilizing the user interface.

8. The system of claim 1, further comprising a data storage device in communication with the user interface.

9. The system of claim 1 disposed within the hull of a vessel, wherein the system affects one or more raw water-using components.

10. The system of claim 1, wherein the sea chest is disposed below a waterline of the hull.

11. The system of claim 1, wherein each of the first mode and second mode permits simultaneous suction of fluid and blowdown of fluid through the sea chest system.

12. A method for alternating recirculation-based blowdown of a sea chest comprising the steps of:
 selecting, by a user, a first mode of operation;
 selecting, by the user, a time interval corresponding to the first mode;
 initiating, utilizing a pump, suction to a sea chest system;
 discharging fluid from a discharge port;
 recirculating fluid from the discharge port to the sea chest system; and
 switching, utilizing a processor, from the first mode to a second mode.

13. The method of claim 12, having a plurality of valves, wherein each valve is disposed along one of the pipes, wherein the valve system is configured to operate in a first mode in which a first isolation valve is open, a second isolation valve is shut, a first blowdown isolation valve is shut and a second blowdown isolation valve is open, and a second mode in which a first isolation valve is shut, a second isolation valve is open, a first blowdown isolation valve is open and a second blowdown isolation valve is shut.

14. The method of claim 12, having a cover assembly, wherein the cover assembly is comprised of a plurality of grates disposed in a housing, wherein each grate selectively permits the ingress and egress of fluid into the sea chest system.

15. The method of claim 12, wherein the cover assembly defines a water transference area.

16. The method of claim 12, further comprising a timing module, wherein the timing module is in communication with the processor, wherein the timing module affects switching between the first mode and the second mode.

17. The method of claim 12, further comprising a data storage device.

18. The method of claim 12, wherein the sea chest is disposed within the hull of a vessel, wherein the system affects an auxiliary system.

19. The method of claim 12, wherein the sea chest is disposed below a waterline of the hull.

20. The method of claim 12, wherein each of the first mode and second mode permits simultaneous suction of fluid and blowdown of fluid through the sea chest system.

* * * * *